Sept. 22, 1970     C. W. ROSE ETAL     3,529,864

CHILD'S SAFETY BELT

Filed June 5, 1968     2 Sheets-Sheet 1

INVENTORS
Clarence W. Rose
BY Jonathan E. Sharp

Van Valkenburgh & Lowe
ATTORNEYS

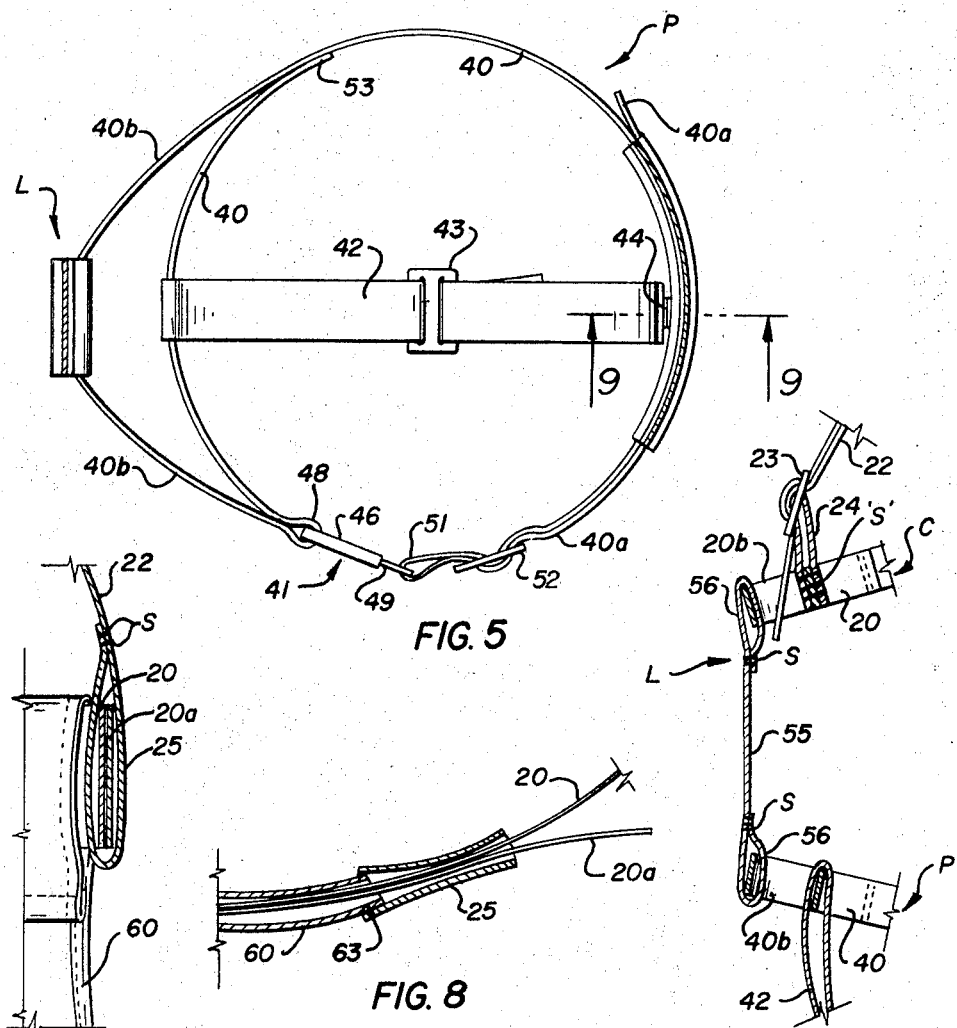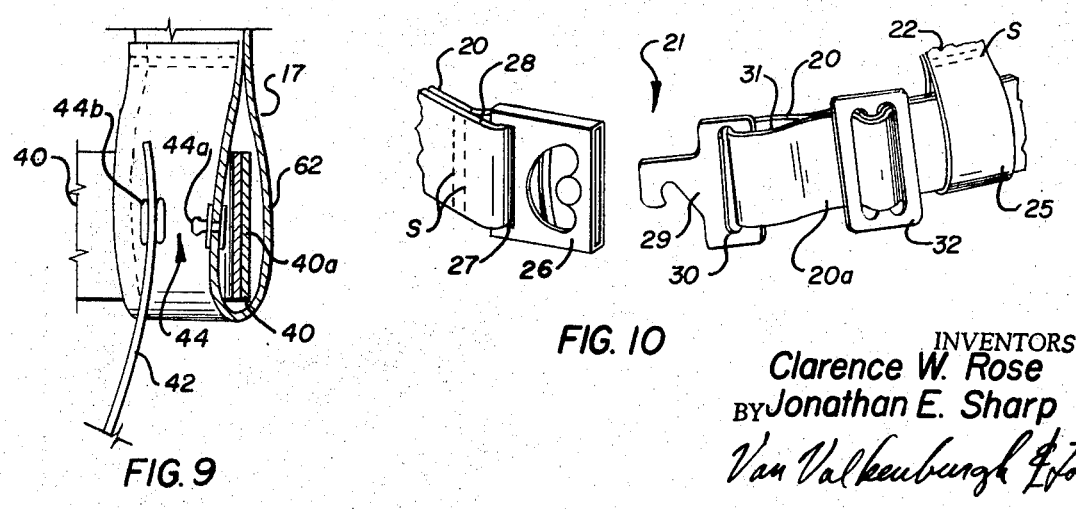

United States Patent Office 3,529,864
Patented Sept. 22, 1970

3,529,864
CHILD'S SAFETY BELT
Clarence W. Rose and Jonathan E. Sharp, Denver, Colo., assignors, by mesne assignments, to Rose Manufacturing Company, Kansas City, Mo., a corporation of Delaware
Filed June 5, 1968, Ser. No. 734,588
Int. Cl. A47c 31/00; A47d 15/00; B60r 21/10
U.S. Cl. 297—387                                        7 Claims

ABSTRACT OF THE DISCLOSURE

A child's safety belt for automobiles and like purposes, which combines a chest harness and a pelvic harness with a linkage at the back of the belt and an abdominal shield at the front of the belt. The linkage will normally be secured to a vertical strap extended about an automobile seat. The top of the abdominal shield is secured to the body pad of the shoulder harness and the bottom of the shield is secured to the bottom of the pelvic harness in an arrangement which permits the weight of a child to be better distributed over the harness in the event of an accident where the child is thrown forwardly from the automobile seat and into the harness.

---

This invention relates to improvements in safety harnesses and more particularly to harnesses of the type which are commonly used to restrain and protect small children when riding inside automobiles and which is commonly referred to as a child's safety belt.

The present invention is an outgrowth of, and an improvement over the invention of a Child's Safety Belt, disclosed and claimed in the Pat. No. 2,888,063, issued to Clarence W. Rose on May 26, 1959. That patent discloses a child's safety belt, or harness, which combines a shoulder harness and a pelvic harness by a linkage at the rear of the combination. This linkage connects to body-encircling bands of each harness and consists of strap loops fastened to the approximate rear quarter points of the body bands which are held together by a vertical link approximately six inches behind the child's body. Such a safety harness, when worn by the child, may be secured to the seat of an automobile by a vertical strap encircling the automobile seat and passed through the strap loops. Not only does this arrangement give a child a considerable amount of necessary freedom of movement, it also provides a restraint at the child's chest and at his pelvis in case of an accident as when the automobile is suddenly stopped and the child is thrown forward in a violent manner. Also, by using strap connections at the rear quarter points of the body bands, an undesirable hoop tension by the body bands is minimized in the event of such an accident.

The worth and value of this safety harness, which restrains a child at his chest and pelvis, rather than at his abdomen, has been amply proven since the patent issued. For instance, in the article entitled "Seat Belts: Tests of Childrens Models" published in Consumers Report, June 1963, a child's safety belt manufactured according to this patent, No. 2,888,063, was the only belt which received the notation "Acceptable: Maximum Protection." Of the nine reported in those tests, two others received an indication of being "Acceptable: Fair Protection" and the remainder, "Not Acceptable." Subsequently, the Society of Automotive Engineers has endeavored to set forth specifications on childrens' safety harnesses which embody, insofar as possible, the important principles taught by the patent, SAE Standards J4C.

However, through the experience of manufacture of these belts, through the use of a large number of them by the public, and through extensive and continuing testing, it became manifest that improvements to this safety belt could be made. A first need was a buckle which would be difficult for a child to disconnect, and the buckle disclosed in the Pat. No. 3,308,516, issued by J. A. Mullan on Mar. 14, 1967, was developed. Yet other improvements were considered desirable. There was a need to better integrate the components forming the belt to make it easier to be fitted upon a child and to lessen the tendency for the several straps of the belt to become tangled when it was not being used. It was found desirable to better restrain the abdominal portion of a child's body and to distribute the pressures occurring on the child's body in a more uniform manner, in the event of a violent accident where the child would be projected forwardly to be checked by the harness.

The present invention was conceived and developed with such considerations in view and comprises, in essence, a child's safety belt of the general type disclosed in the Rose patent, No. 2,888,063, but having the various strap and band portions and buckles rearranged in a more facile manner and with an abdominal shield interconnecting the frontal portions of the chest and pelvic harnesses, all as will be hereinafter described in detail.

Accordingly, an object of the present invention is to provide a novel and improved child's safety belt, or harness, for automobiles which will effectively hold a child at his chest and pelvis in the event of an accident which throws him against the belt, and also provides for restraining his abdomen, and better distributing the resulting pressures of the harness over a broader area of the child's body.

Another object of the invention is to provide a novel and improved child's safety belt for automobiles which is easily fitted upon a child almost as if it were a garment, and thereafter is quickly and easily fastened by an arrangement of buckles at the side of the child at locations easily reached by an adult, but not easily reached by the child wearing the harness, and thereby minimizing the chance of a child removing the belt at an inopportune time.

Another object of the invention is to provide a novel and improved child's safety belt which is easily adjustable to size and thus may be manufactured in as few as two sizes, with one size being adapted to fit children ranging from infants to children approximately 3½ years old and another size for children ranging in age from approximately 3½ years to approximately six years, for thereafter they will be large enough to use adult seat belts in an automobile.

Other objects in the invention are to provide in a novel and improved child's safety belt, constructions and arrangements which form a simple, neat appearing, economical, reliable, rugged and durable unit.

With the foregoing and other objects in view, all of which more fully hereinafter appear, our invention comprises certain constructions, combinations and arrangements of parts and elements as will be described, defined in the appended claims and illustrated, in preferred embodiment in the accompanying drawing, in which:

FIG. 5 is a topside view of the lower portion of the harness as taken from the indicated line 5—5 at FIG. 2, but on an enlarged scale.

FIG. 6 is a fragmentary sectional detail as taken from the indicated line 6—6 at FIG. 4, but including also, the lower portion of the harness.

FIG. 7 is a fragmentary sectional detail as taken from the indicated line 7—7 at FIG. 3, but on an enlarged scale.

FIG. 8 is a fragmentary sectional detail as taken from the indicated line 8—8 at FIG. 3, but on an enlarged scale.

FIG. 9 is a fragmentary sectional detail as taken from the indicated line 9—9 at FIG. 5, but on an enlarged scale and with the components shown therein being separated.

FIG. 10 is a fragmentary perspective view of a portion of the chest band of the unit as taken substantially from the indicated line 10–10 at FIG. 3, but on an enlarged scale and with the buckle connector being open.

Figure 1:
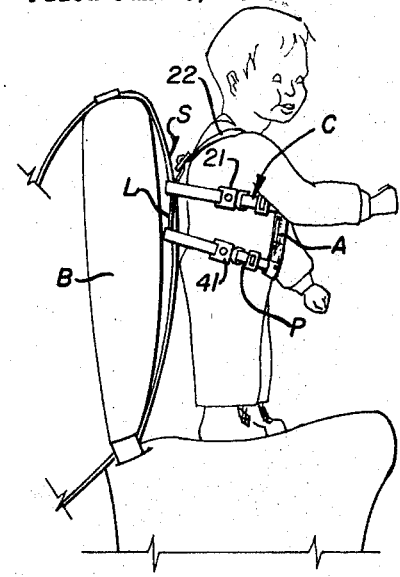
FIG. 1 is a side elevation view of a child wearing the harness and standing upon the seat of an automobile to which the harness is attached, as to a vertical strap about the back of the seat.

Referring more particularly to the drawing, the improved child's safety belt combines a chest harness C with a pelvic harness P, an interconnecting attachment linkage L at the back of the units and an abdominal shield A at the front of the units. This safety belt combination is especially adapted to be used with a fixed restraining strap S which is wrapped vertically about a rigid back cushion B of an automobile seat as in the manner illustrated at FIG. 1, it being understood that the strap S will extend rearwardly from the seat and be anchored to the floor of the automobile to hold the seat in place in any suitable manner, but this is not shown in the drawing since such arrangements are conventional.

The chest harness C includes a chest band 20 which may be formed of a selected lightweight, strong, nylon web or any other type of web or strap obviously suitable for the purpose at hand. This band 20 is adapted to be fitted about a child's chest at a level immediately below his armpits and connected by a buckle 21 at one side thereof and generally rearwardly of the child's armpit to thus be at a location difficult for the child to reach. A pair of shoulder straps 22 extend upwardly from the back center of this chest band as from a three-bar slide adjuster 23. This adjuster 23 is carried upon a short loop 24 stitched to the back center point of the band 20 as by stitching s as indicated at FIG. 6. The two straps 22 extend from this buckle 23 upwardly and forwardly and thence downwardly to spaced-apart locations at the front of the band 20, and each strap end is attached to the front of the band by a loop 25 slidably embracing the band 20. Each loop 25 is formed by lapping the end of a strap 22 upon itself and the end is stitched in place as by stitching s indicated at FIG. 7.

The buckle 21 is of a selected type such as that disclosed in the patent, No. 3,308,516. It includes a socketed body 26 with a slot 27 at its base. This slot 27 receives the rearward portion of the web forming the chest band 20. This web forms a loop 28 about the buckle base which is stitched into position by stitching s, best illustrated at FIG. 10. The inner portion of the loop 28 is extended as a chest band 20 while the outer portion extends rearwardly to form a portion of the attachment linkage L as will be described.

The buckle also includes a tongue 29 which fits into the socket of the body portion 26, and this tongue includes a slot 30 at its base wherethrough the forward end of the chest band 20 is threaded, from the inner to the outer side of the band, to form an adjustable loop 31 at the slot 30 so that the tongue-end 20a of the band 20 laps upon and about the outer side of the forward portion of the band 20. These two band portions 20 and 20a are locked together by a three-bar slide adjuster 32 adjacent to the buckle 21.

Figure 4:
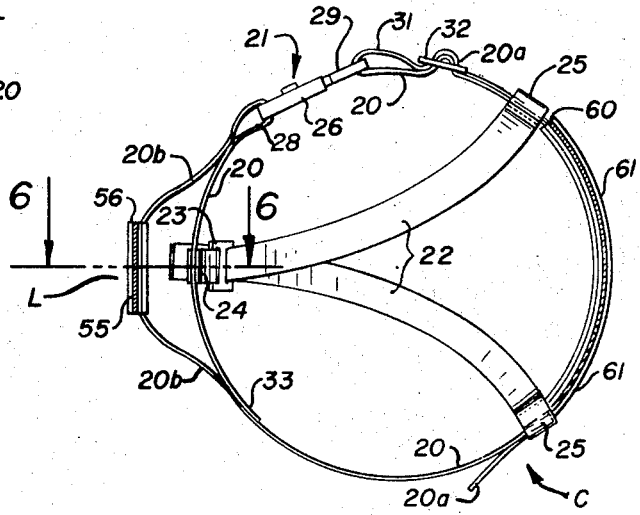
FIG. 4 is an underside view of the upper portion of the harness, as taken from the indicated line 4—4 at FIG. 2, but on an enlarged scale.

The outward portion of the web forming the loop 28 extends rearwardly from the chest band as a linkage strap the loop 20b continues therefrom as a portion of the chest band 20 to connect therewith at a juncture 33. This connection juncture 33 and the loop 28 are located at the approximate rear quarter points of the chest band 20, as illustrated at FIG. 4, to direct the pull of the strap loop 20b against the chest band 20 at spaced-apart points and thereby minimize hoop tension upon a child wearing the harness.

Figure 3:
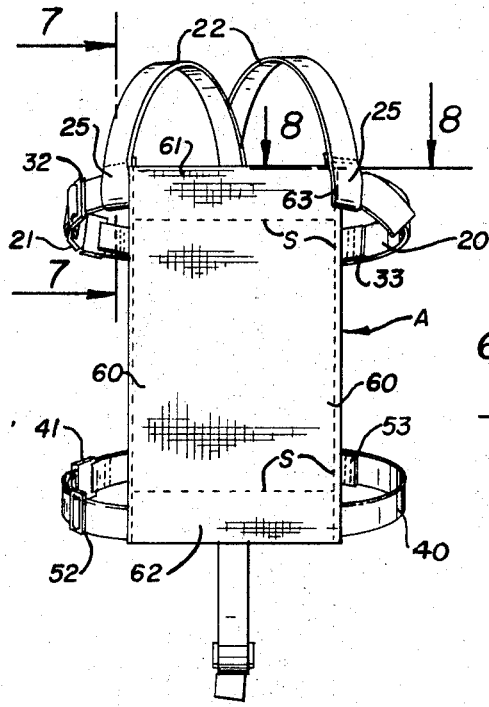
FIG. 3 is a front elevational view of the harness per se.

The chest band 20 within the loop 20b terminates as an end at this juncture 33 while the web portion forming the loop 20b continues therefrom as a portion of the chest band, extending about the rear of the chest band, the two portions being securely stitched together as by stitching s, indicated at FIG. 3.

This is a very simple arrangement which forms the chest band 20, its tongue portion 20a and the strap loop 20b by folding and stitching a single length of webbing. Moreover, adjustment of the chest harness C on an individual child is a quick, simple matter. The chest band 20 is fitted about the child's chest at a position suitably below the armpits by adjustments of the web tongue portion 20a with the slide adjuster 32. Once the chest band is set, the length of the shoulder straps 22 is adjusted at the slide adjuster 23. The loose end of the web tongue 20a of the chest band 20 is thereafter threaded through the shoulder strap loops 25 and through a connective loop at the top of the abdominal shield A, hereinafter described, to lie against the outer face of the band 20 as shown in the drawing at FIG. 4.

Figure 2:
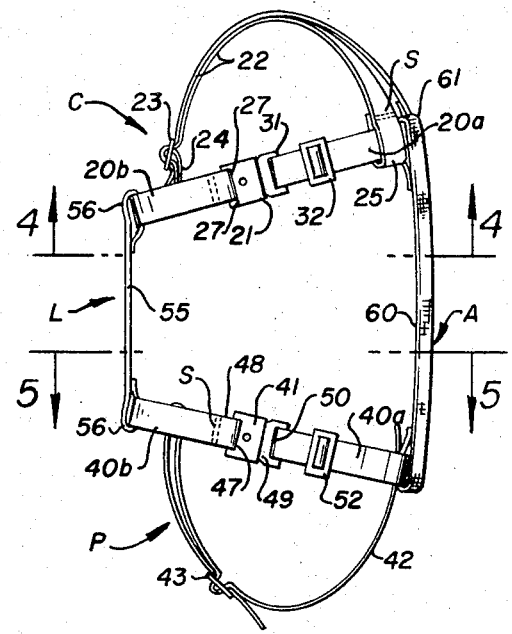
FIG. 2 is a side elevation view of the harness per se.

The pelvic harness P includes a pelvic band 40 which may be formed of a selected lightweight nylon web, the same as the chest band 20. This band 40 is adapted to be fitted about a child's pelvis to bear against the bone structure forming the pelvis, and connected thereto by a two-piece latch buckle 41 at one side of, generally rearwardly of the child and directly below the chest band buckle 21. A crotch strap 42 extends downwardly from the back center of this pelvic strap as a looped portion which is closed by a three-bar slide adjuster 43 as illustrated at FIGS. 2 and 5. The strap 42 extends downwardly and forwardly and thence upwardly to the center of the base of the abdominal shield A. There, it connects with this shield by a snap lock 44 illustrated at FIG. 9 and hereinafter further described.

The latch 41 is preferably the same as the latch buckle 21. It includes a socketed body 46 with a slot 47 at its base. The slot receives the rearward portion of the web forming the pelvic band 40. This web portion forms a loop 48 about the buckle base which is stitched in position by stitching s, as illustrated at FIG. 2. The inner portion of the loop 48 is formed by the pelvic band 40 while the outer portion extends rearwardly to form part of the attachment linkage L as will be described.

The buckle also includes a tongue 49 which fits into the body portion 46 and this tongue includes a slot 50 at its base wherethrough the forward end of the pelvic band is threaded, from the inner to the outer side of the band to form an adjustable loop 51 at the slot 50 so that the tongue end 40a of the band laps the band 40. These two band portions 40 and 40a are locked together by a three-bar slide adjuster 52 adjacent to the buckle 41.

The outward portion of the web forming the loop 48 extends rearwardly from the pelvic band as a linkage strap loop 50b which extends to the opposite side of the pelvic band 40 to connect therewith at a juncture 53. This connection juncture 53 and the loop 48 are located at the approximate rear quarter points of the pelvic band 40 as illustrated at FIG. 5, to advantageously direct the pull of the strap loop 40b against the pelvic band at spaced-apart points to minimize hoop tension as heretofore described. The pelvic band 40 within the loop 40b terminates as an end at this juncture 53 while the web forming the loop 40b continues as a portion of the pelvic band, the two portions being securely stitched together.

As in the case of the chest band 20, this is a very simple arrangement which forms the pelvic band 40, its tongue portion 40a and the strap loop portion 40b, by folding and stitching a single length of webbing. Adjustment is also simple. The pelvic band is fitted about the child's pelvis by adjustments of the web tongue portion 40a with the slide bar adjuster 52. The loose end of the web tongue 40a is threaded through a connective loop at the bottom of the abdominal shield to be out of the way. Then the crotch strap may be fitted and adjusted to length by adjustments with the slide bar adjuster 43.

The attachment linkage L which interconnects the back of the chest harness C and pelvic harness P includes the chest strap loop 20b and the pelvic strap loop 40b, both of which extend rearwardly from the approximate rear quarter points of their respective bands 20 and 40 as heretofore described. The linkage L also includes a vertical link 55 formed by a short, web member having its ends overlapped and stitched as by stitching s, to form a loop 56 at the upper and lower end of the web 55, through which the respective strap loops 20b and 40b slidably extend. This vertical link is preferably of a heavier and stiffer webbing than that forming the chest preferably being sufficiently stiff as to hold the chest and pelvic bands and the straps loops formed by them, and pelvic strap loops apart to suggest that this child's safety harness is somewhat in the nature of a garment.

The similarity of this child's harness to a garment is also suggested and emphasized by the construction of the abdominal shield A which extends between the front portions of the chest harness and the pelvic harness. It is preferably being sufficiently stiff as to hold the chest somewhat similar to that of cardboard or reinforced cloth material so that it may be folded, shaped and sewn, but resist warping and stretching and will retain its form when not under pressure.

This shield A is essentially rectangular with the side edges 60 being lapped and stitched. It includes a top loop 61 and a bottom loop 62 which are formed by lapping the ends of the shield and stitching the loops in position as indicated at s, at FIG. 3.

The chest band 20 and its tongue portion 20a sildably extend through this top loop 61 and is fitted between the shoulder strap loops 25, as illustrated. It was found advantageous to attach one edge of the loop 61 to the edge of that shoulder strap loop 25 which lies opposite to the buckle 21, as at 63, to help hold the assembly in position when the buckle is opened, as illustrated at FIGS. 3 and 8. The drawing illustrates the latch buckle 21 as being on the right hand side of the child, and accordingly, the attachment 63 of the loop 25 to the edge of the loop 60, is at the left side.

This shield also includes the bottom loop 62 through which the pelvic band 40 and its tongue portion 40a slidably extends, as illustrated at FIG. 9. The front end of the crotch strap 42 is attached to the inner side of this loop 63 at the center thereof by the snap lock 44. The lock 44 is of any conventional type of snap, such as the common two-piece unit illustrated, one being a stud 44a and the other a socket 44b. In the illustration, the stud 44a is fitted onto the shield A and the socket 44b is fitted onto the crotch strap, but this arrangement is optional. It is to be noted that the crotch strap 42 is connected to both the front and rear of the pelvic harness, but that the frontal connection is to the shield A and this permits the pelvic band 40 to slide through the shield loop 63 for adjustments without interference from the front connection of the crotch strap.

The fitting of this child's safety belt, or harness, is a simple matter. When the buckles 21 and 41 are opened, a child can easily put on or take off the harness as if it were a garment without the parts becoming tangled. Since the use of this child's safety belt is essentially for automobiles, the attachment linkage is ordinarily secured to a vertical strap S wrapped about the upright back B of an automobile seat, as illustrated at FIG. 1. Other uses for the harness were exemplified in the prior patent, No. 2,888,063, and hence, need not be enlarged upon in this description.

The abdominal shield A does not interfere with a child's wearing of the harness, but actually facilitates fitting it upon him. Also, this shield is important in case of an accident where the child is thrown forwardly to be checked by the harness. Not only does it prevent the soft abdominal region of a child from being unduly distended in the event of such an accident, but also it greatly reduces the pull and strain upon the child's pelvis and shoulders.

We have now described our invention in considerable detail. Nevertheless, it is obvious that others skilled in the art can build and device alternate and equivalent constructions which are nevertheless within the scope and spirit of our invention.

We claim:

1. In a child's safety harness of the type having a chest band adapted to encircle the chest of a child, a pelvic band adapted to encircle the pelvis of a child and a linkage interconnecting the rearward portions of these bands and adapted to be secured to an anchor means to hold the harness, the improvement comprising an abdominal shield interconnecting the forward portions of the chest and pelvic bands by laterally slidable connectors, said shield being of a substantially non-stretchable, pliable sheet-like material, essentially rectangular in form, with its top edge connected to the chest band and its bottom edge connected to the pelvic band in a manner to transmit stress between the chest band and the pelvic band and to restrain the abdomen of a child wearing the harness in the event of an accident where the child is thrown forwardly with his movement being checked by the abdominal shield, the chest band and the pelvic band.

2. In the harness defined in claim 1, wherein:
said abdominal shield is lapped at its top and at the bottom edges to form passageways through which the respective chest and pelvic bands extend; and
adjusting and disconnecting means for each of said pelvic band and chest band are disposed at one side.

3. In the organization defined in claim 1, wherein said shoulder harness includes shoulder straps extending from a common connection at the rear center of the chest band and forwardly to separated connections at the front of the chest band, and wherein said abdominal shield is connected to the chest band between said front shoulder strap connections.

4. In the organization defined in claim 3, wherein said connection of the abdominal shield to the chest band is formed by a lap of the top of the shield to constitute a passageway through which the chest band slidably extends and wherein said front shoulder strap connections to the chest band are formed as loops through which the chest band slidably extends to facilitate adjusting the size of the chest band to fit an individual child and shifting the abdominal shield and the shoulder straps to be centered upon the child.

5. In the organization set forth in claim 4, wherein:
adjusting and disconnecting means for each of said pelvic band and chest band are at one side; and
one shoulder strap is affixed to the abdominal shield by interconnecting an edge portion of the shoulder strap loop opposite said adjusting and disconnecting means with the corresponding edge of the abdominal shield loop.

6. In the organization defined in claim 1, wherein said pelvic harness includes a crotch strap extending from the rear center of the pelvic strap and forwardly to the front center of the harness, and wherein a removable connection of the crotch strap at the front center of the harness is to the bottom portion of the abdominal shield.

7. A safety harness adapted to be secured about the body of a child, with chest and pelvic bands each formed of a single length of webbing and arranged as a body band and a connection loop extending rearwardly from the body band from the approximate rearward quarter points of the body band, and a two-piece buckle at a side of said body band, one end of said body band being adjustably connected to the forward piece of the buckle and extending forwardly and about the body of a child, thence rearwardly at the opposite side to the rearward quarter point of the side opposite to the buckle and continuing therefrom rearwardly to form said connection loop, said connection loop extending behind the body band and thence forwardly to a loop connection with the rear piece of said buckle, from said rear buckle piece extending rearwardly and around to form the rearward portion of the body band, and said opposite end being affixed to said band at the aforesaid rear quarter point at the side opposite from the buckle.

References Cited

UNITED STATES PATENTS

| | | | |
|---|---|---|---|
| 2,888,063 | 5/1959 | Rose | 297—387 |
| 3,125,375 | 3/1964 | Bird et al. | 297—389 |
| 3,136,581 | 6/1964 | Caballero | 297—384 |
| 3,316,017 | 4/1967 | Knight | 297—385 |
| 3,321,247 | 5/1967 | Dillender | 297—389 |
| 3,380,776 | 4/1968 | Dillender | 297—389 |

JAMES T. McCALL, Primary Examiner

U.S. Cl. X.R.

297—358, 389